United States Patent [19]

Tucker

[11] 4,301,567
[45] Nov. 24, 1981

[54] ROTARY TERMINAL CLEANER

[76] Inventor: Walter R. Tucker, 28 Oak St., Deposit, N.Y. 13750

[21] Appl. No.: 152,694

[22] Filed: May 23, 1980

[51] Int. Cl.³ .............................................. A46B 3/18
[52] U.S. Cl. .................................. 15/160; 15/104.04; 15/179
[58] Field of Search ............ 15/104.04, 236 R, 104.03, 15/236 A, 105, 111, 104.01 R, 104.01 P, 160, 179

[56] References Cited

U.S. PATENT DOCUMENTS

| | | | |
|---|---|---|---|
| 1,362,822 | 12/1920 | Rude | 15/179 X |
| 1,710,127 | 4/1929 | Vaughn | 15/236 R X |
| 3,088,150 | 5/1963 | Sweeney | 15/160 X |
| 3,188,674 | 6/1965 | Hobbs | 15/160 X |
| 4,133,070 | 1/1979 | Litt | 15/104.04 X |

FOREIGN PATENT DOCUMENTS

| | | | |
|---|---|---|---|
| 1419 | of 1926 | Australia | 15/160 |
| 1031561 | 6/1966 | United Kingdom | 15/104.04 |

*Primary Examiner*—Chris K. Moore
*Attorney, Agent, or Firm*—George E. Clark

[57] ABSTRACT

A rotary terminal cleaner for cleaning terminals such as on automotive batteries and the like includes a cylindrical housing having an internal key running along the housing, an end cap having a cylindrical shape for mating with the hollow housing and forming a snug fit within an end of the hollow housing, the end cap having a longitudinal slot to mate with the key of the housing to prevent relative rotation of the end cap and the housing, the end cap also having a shaft integrally formed with the end cap for driving the cleaner by a rotary device such as a power drill. The cleaner also includes first and second brushes of abrasive material which fit within the hollow housing to abrade and clean the terminals. The first brush is a rectangular piece of abrasive material perhaps having bristles such as a section of a wire brush which fits in the end cap in such a manner as to permit the bristles to be facing the open end of the hollow housing. The second brush is a strip having a generally rectangular shape also having a plurality of bristles the second brush being formed in a circular manner within the hollow housing in such a manner as to be held in place by the key way on the inside of the housing and which in turn holds the first brush in fixed position.

3 Claims, 4 Drawing Figures

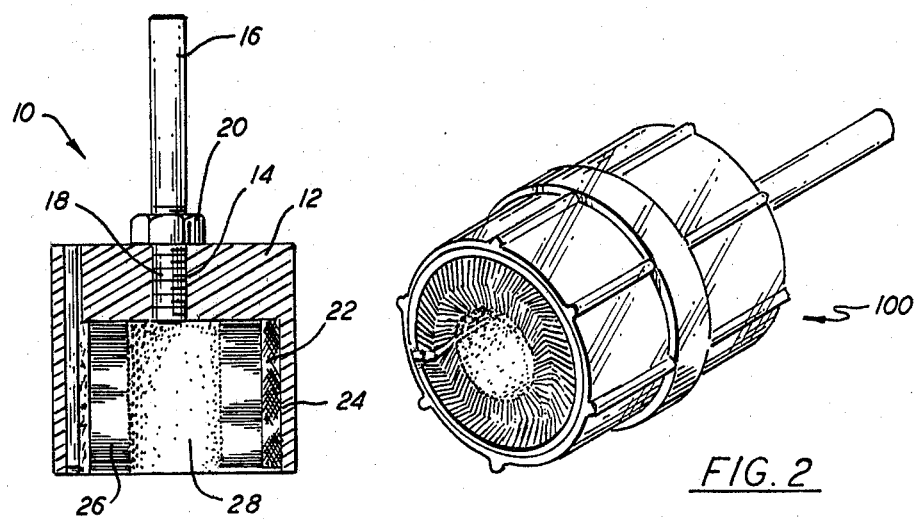
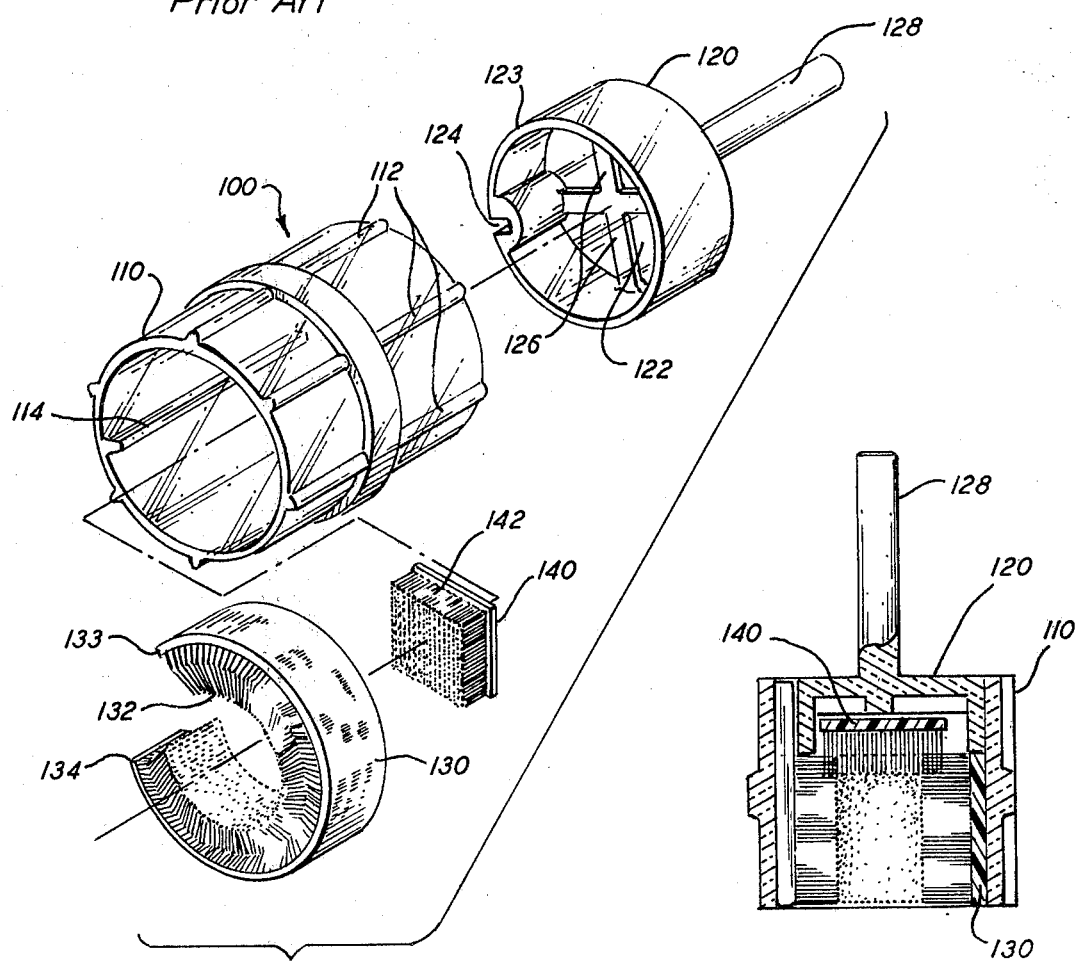
FIG. 1 Prior Art
FIG. 2
FIG. 3
FIG. 4

ROTARY TERMINAL CLEANER

BACKGROUND OF THE INVENTION

The present invention relates to cleaning devices for cleaning cylindrical posts or terminals and more particularly to a cleaning device for cleaning both the sides and top of a post or terminal.

In the prior art there are two devices which relate to the present invention.

The first is disclosed in U.S. Pat. No. 3,088,150 and shows a manual battery terminal brush which has been widely sold and used over a considerable period of time. The manual cleaner of the patent has a cylindrical wire brush within the cleaner for manually cleaning battery terminals around the sides thereof. It further has a wire brush for cleaning the interior circumference of battery cables. The structure shown in the patent is basically a throw away item since as the wire brush wears out or becomes severely bent out of shape it loses its effectiveness and must be replaced. There is no provision for removing the wire brush portion from the housing and replacing it with a new wire brush member. The wire brush is permanently formed into the housing by heat or other method to prevent rotation between the brush and the housing during the cleaning operation. The manual terminal cleaner according to the patent does not have means for cleaning the tops of battery terminals.

Another prior art device is shown in U.S. Pat. No. 3,188,647 which shows a rotary tube end cleaner which may be driven by power accessories such as a drill. The rotary tube end cleaner shown by the patent includes a cylindrical housing having a shank attached to a back end for insertion into the drill, a pair of threaded holes on oposite sides of the outer surface of the housing to accept set screws which are used to retain a split compressible sleeve which in turn holds a wire brush member in place within the housing. An end cap is threaded on to the open end of the housing to keep the wire brush from being pulled out of the end of the housing under the force of rotation. The set screws may be tightened into the split sleeve as the wire brush elements wear down to maintain contact with the tube end to be cleaned.

The rotary tube end cleaner of the patent does not teach a means for cleaning the top end of a terminal or tube and requires an end retainer, a compressible sleeve and two or more set screws to hold the compressible sleeve in position and to prevent rotation of the wire brush member.

SUMMARY OF THE INVENTION

Accordingly, it is an object of the present invention to clean a terminal or post through the use of a rotary terminal cleaner having first and second abrading members, the first abrading member being adapted to clean an exterior cylindrical side portion of said terminal and the second abrading member being adapted to clean a top or bottom, flat portion of said terminal.

It is another object of the present invention to clean a terminal or post employing a cleaner as set out above in which the first and second abrading members are easily removed and replaced when worn.

It is still another object of the present invention to clean a terminal or post using apparatus as set out above wherein the cleaning apparatus includes a housing which is generally cylindrical in shape having a key which mates with a corresponding slot in the end cap to prevent relative rotation of the housing and the end cap and also to hold the first abrading member securely in place during operation of the terminal cleaner.

Therefore, a rotary terminal cleaner includes a hollow cylindrical housing which may be constructed of a high strength plastic material, the housing having longitudinal reinforcements on the exterior portion of the housing and having an internal key running logitudinally along the housing, an end cap adapted to fit snugly within said hollow housing at one end thereof and having a slot adapted to mate with said key to prevent relative rotation between said end cap and said hollow housing, said end cap having attached thereto a shaft or shank for driving the cleaner through the use of a rotary power device, the hollow housing containing first and second abrading members, such as wire brush members, the first abrading member being generally rectangular in shape and being placed around the inner circumference of the hollow housing and being held in place by the key member to avoid rotation of the wire brush relative to the housing and the second abrading member being placed within the hollow housing near the end cap to clean the top of a terminal or post wherein the second abrading member is held in the position by frictional contact between individual wire brush elements in the first and second abrading members.

It is a feature of the present invention that all exposed surfaces of a battery terminal or the like may be cleaned through the use of a terminal cleaner according to the present invention.

These and other objects of the present invention will become immediately apparent from the following detailed description in conjunction with the accompanying drawing.

BRIEF DESCRIPTION OF THE DRAWINGS

FIG. 1 is a cross section view of a prior art rotary terminal cleaning device.

FIG. 2 is a perspective view of a rotary terminal cleaner according to the present invention.

FIG. 3 is a break away view of a rotary terminal cleaner according to the present invention.

FIG. 4 is a cross section view of a rotary terminal cleaner according to the present invention.

DETAILED DESCRIPTION OF A PREFERRED EMBODIMENT OF THE INVENTION

Referring to FIG. 1, a prior art terminal cleaner will be described so as to provide a background for the present invention. Prior art terminal cleaner 10 includes a housing 12 generally constructed of metal such as steel or the like, the housing being generally cylindrical in shape and having a threaded opening 14 in a top portion of housing 12. A shaft 16 having a lower end 18 threaded to match with the threaded portion 14 of housing 12 is secured to housing 12 by lock nut 20. A wire brush element 22 such as is described in U.S. Pat. No. 3,188,674 is secured to an inner wall 24 of housing 12. Wire bristles 26 extend radially inward within an openin 28 in housing 12 where a terminal will be placed for cleaning.

The prior art terminal cleaner shown in FIG. 1 does not provide any means for cleaning the tops of terminals nor is there any method for readily replacing the wire brush element 22 when it becomes warn through excessive use.

Referring now to FIGS. 2, 3, and 4, a rotary cleaner according to the present invention will be described.

Rotary terminal cleaner 100 includes a hollow cylindrical housing 110 which may be constructed of a strong plastic material or the like having a plurality of reinforcing ribs 112 around the exterior of housing 110. An internal molded key 114 runs longitudinally along an inner surface of housing 110. Key 114 has two functions. The first is to mate with slot 124 in end cap 120 to lock housing 110 to end cap 120 to prevent relative rotation of the two members 110 and 120 when the cleaner is being used and second to secure first wire brush element 130 in place to prevent rotation of first wire brush element 130 relative to housing 110 during operation of the terminal cleaner. Second wire brush element 140 which may be of a generally rectangular shape is adapted to fit in recess 122 within end cap 120 to clean the tops of battery terminals and the like.

End cap 120 has reinforcing members 126 to provide rigidity to end cap 120 and a molded shank 128 to permit the cleaner to be rotatably driven by a rotary power source. Slot 124 is essentially a slot cut into the wall 123 of end cap 120 which mates with an upper portion of key 114 in housing 110.

The assembly of the rotary terminal cleaner according to the present invention as shown in FIG. 3 is very straight forward. Second wire brush element 140 is placed in recess 122 of end cap 120. Then housing 110 is aligned so that key 114 mates with slot 124 and the housing 110 and end cap 120 are pressed together. The first wire brush element 130 is then formed in a circular manner with the bristles 132 pointing inwardly and placed inside housing 110 so that the respective ends 133 and 134 of first wire brush element 130 are abutting oposite sides of key 114.

As can be seen in FIG. 4, the bristles 132 of first wire brush element 130 and 142 of second wire brush element 140 intermesh with each other locking wire brush elements 130 and 140 in place so that the wire brush elements rotate together when the cleaner is driven by a rotary device.

It can be seen from the preceeding description of a preferred embodiment of the present invention that the addition of second wire brush element 140 permits the tops as well as sides of battery terminals and the like to be cleaned as distinct from the prior art devices which do not provide means for cleaning the tops of terminals. Further, the present invention contains a readily replaceable set of wire brush elements which are held in place by frictional contact and by key 114. Additional, the present invention does not require an end cap to restain the wire brush elements in place such as is required by U.S. Pat. No. 3,188,674.

Although a preferred embodiment of the invention has been described, it will be apparent to those skilled in the art that there are many variations and modifications which may be made without departing from the spirit or scope of the invention. Therefore, the invention is not to be limited by the specific disclosure of a preferred embodiment herein, but only by the appended claims.

What is claimed is:

1. Apparatus for cleaning cylindrical terminals, comprising:

a housing having first and second parts, said first part comprising a generally cylindrical member having an internal key, and said second part comprising an end cap having a slot therein for mating with said internal key in said first part to prevent relative rotation between said first part and said second part during operation; and first and second abrading members located within said housing, said first abrading member being adapted to clean an exterior cylindrical surface of said terminal and said second abrading member being adapted to clean a flat end surface of said terminal.

2. Apparatus according to claim 1, wherein said first abrading member and said second abrading member further comprise a plurality of abrading elements, wherein a first group of abrading elements on said first abrading member interlock with a second group of abrading elements on said second abrading member for retaining said second abrading member in a fixed position relative to said first abrading member.

3. Apparatus according to claim 1 wherein said second part of said housing further includes a shaft integrally formed with said second part to adapt said apparatus for rotation by a power tool.

* * * * *